US005671719A

United States Patent [19]

Jeong

[11] Patent Number: 5,671,719

[45] Date of Patent: Sep. 30, 1997

[54] FUEL ACTIVATION APPARATUS USING MAGNETIC BODY

[76] Inventor: Tae Young Jeong, 508, Mabuk-ri, Kusung-myon, Yongin-gun, Kyunggi-do, Rep. of Korea

[21] Appl. No.: 528,695

[22] Filed: Sep. 15, 1995

[30] Foreign Application Priority Data

Sep. 16, 1994 [KR] Rep. of Korea ....................... 94-23625

[51] Int. Cl.[6] ................................................ B01D 35/06

[52] U.S. Cl. ................................................ 123/538

[58] Field of Search ................................ 123/536, 537, 123/538; 210/222, 695

[56] References Cited

U.S. PATENT DOCUMENTS

| | | | |
|---|---|---|---|
| 3,830,621 | 8/1974 | Miller | 210/222 |
| 4,372,852 | 2/1983 | Kovacs | 210/222 |
| 4,519,919 | 5/1985 | Whyte et al. | 210/695 |
| 4,538,582 | 9/1985 | Wakuta | 123/536 |
| 4,716,024 | 12/1987 | Pera | 210/222 |
| 5,118,416 | 6/1992 | Janczak et al. | 210/695 |

*Primary Examiner*—Marguerite McMahon
*Attorney, Agent, or Firm*—Dilworth & Barrese

[57] ABSTRACT

Disclosed is a fuel activation apparatus using a magnetic body, capable of ionizing fuels so as to obtain high combustion efficiency for a liquid or gas fuel. The fuel activation apparatus of the present invention comprises a helical net of a magnetic material which makes the fuels rotatably flow and allows a magnetic force uniformly effective around the fuels. Thus, the ionization of the fuels is maximized, thereby heightening combustion efficiency of the fuels. The apparatus can be used in vehicles and mechanism using internal combustion engines, etc.

19 Claims, 2 Drawing Sheets

FUEL ACTIVATION APPARATUS USING MAGNETIC BODY

BACKGROUND OF THE INVENTION

1. Field of the Invention

The present invention relates to a fuel activation apparatus using a magnetic body, and particularly to a fuel activation apparatus using a magnetic body, capable of maximizing ionization of fuel particles to obtain better fuel combustion efficiency, in which fuels rotate and flow under the influence of a magnetic force.

2. Description of Related Art

Generally, a liquid or gas fuel used for an internal combustion engine is composed of a set of molecules. Each molecule includes a number of atoms, each of which is composed of a nucleus and electrons orbiting around their nucleus. The molecules have magnetic moments in themselves, and the rotating electrons cause magnetic phenomena.

Thus, positive (+) and negative (−) electric charges exist in the fuel's molecules. For this reason, the fuel particles of the negative and positive electric charges are not split into more minute particles. Accordingly, the fuels are not actively interlocked with oxygen during combustion, thereby causing incomplete combustion. To improve the above, the fuels have been required to be decomposed and ionized. The ionization of the fuel particles is accomplished by the supply of magnetic force from the magnetic body.

Typical examples of the prior art are in detail disclosed in U.S. Pat. Nos. 456,891, 4,933,151 and 5,329,911.

Fuel ionization apparatuses in U.S. Pat. Nos. 456,891 and 4,933,151 disclose that a number of magnets enclose a fuel duct, or the fuels are made to flow through small holes perforated on the central portion of magnets. The former allows a large amount of magnetic forces to be applied to the fuel by which a plurality of magnets are disposed outside a fuel duct. However, this case has a drawback that better ionization of the fuel is not accomplished due to limitation of time and space for ionization as well as too much magnetic force being applied to the fuels. The latter arranges a plurality holes on the central portion of a large-sized magnet, through which the fuels flow. This latter reduces combustion efficiency because the supply of too much magnetic force and over-ionization of the fuels are caused, compared with the time and space that the fuels pass.

U.S. Pat. No. 5,329,911 by the inventor of the present invention uses a fuel activation member which is a metal plate having a plurality of holes and is wound in a helical shape so that the fuels rotatably flow, and enhances combustion efficiency as the magnetic forces are applied to the external side of the fuel duct in which the fuels flow. However, this patent also has a problem that the fuels are not in maximized ionization state as the magnetic force does not influence the whole fuels, with combustion efficiency being thereby slightly decreased and difficulty in a bending process of the fuel duct being raised.

SUMMARY OF THE INVENTION

Therefore, to solve the above problems, it is an object of the present invention to provide a fuel activation apparatus using a magnetic body, capable of obtaining combustion efficiency better than conventional apparatuses.

To accomplish the above object of the present invention, there is provided a fuel activation apparatus using a magnetic body, which is disposed between a fuel supply end and a fuel consumer end and which enhances combustion efficiency of the fuels that are supplied from the fuel supply end to the fuel consumer end, the fuel activation apparatus comprising:

a fuel activation duct having a shape of a hollow pipe, connected between the fuel supply end and the fuel consumer end and provided as a fuel supply path; and a helical net having a magnetic property, installed at the inside of the fuel activation duct, for enabling the fuel passing through the fuel activation duct to rotatably flow and making a magnetic force uniformly effective on the fuel therethrough.

BRIEF DESCRIPTION OF THE DRAWINGS

The preferred embodiments are described with reference to the drawings wherein.

DESCRIPTION OF THE PREFERRED EMBODIMENTS

A preferred embodiment of the present invention will be described below in more detail with reference to the accompanying drawings.

Figure 1:
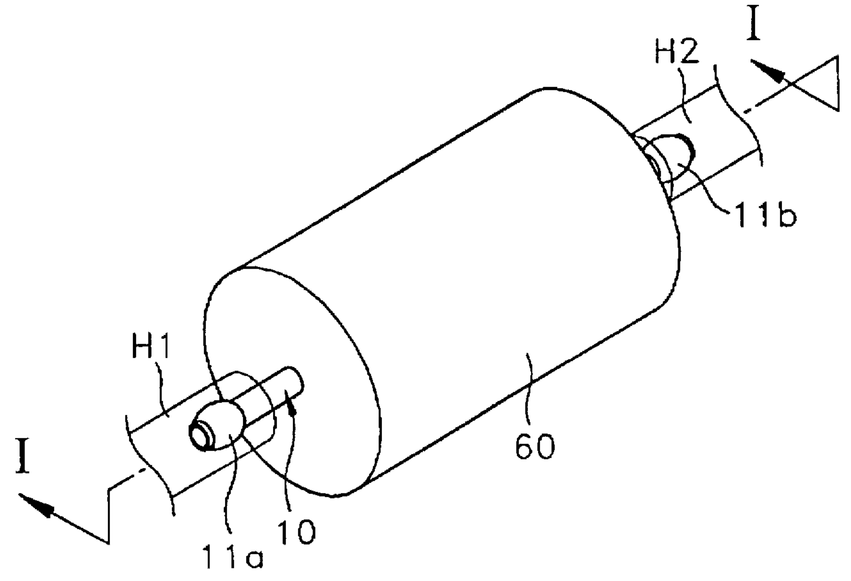
FIG. 1 is a perspective view of a fuel activation apparatus using a magnetic body according to one embodiment of the present invention.

FIG. 1 is a perspective view showing the exterior of an activation duct of a fuel activation apparatus according to one embodiment of the present invention. As shown in FIG. 1, the fuel activation apparatus of the present invention comprises a hollow fuel activation duct 10 having a predetermined length. One end **11*a* of the fuel activation duct 10 is connected to a fuel supply pipe H1 of a fuel supply end, while the other end 11*b* thereof is connected to a fuel supply pipe H2 of a fuel consumer end. The apparatus comprises a cover 60 coated with a material such as a resin thereon to enclose the whole fuel activation duct 10 excluding both ends 11*a* and 11*b***.

Figure 2:
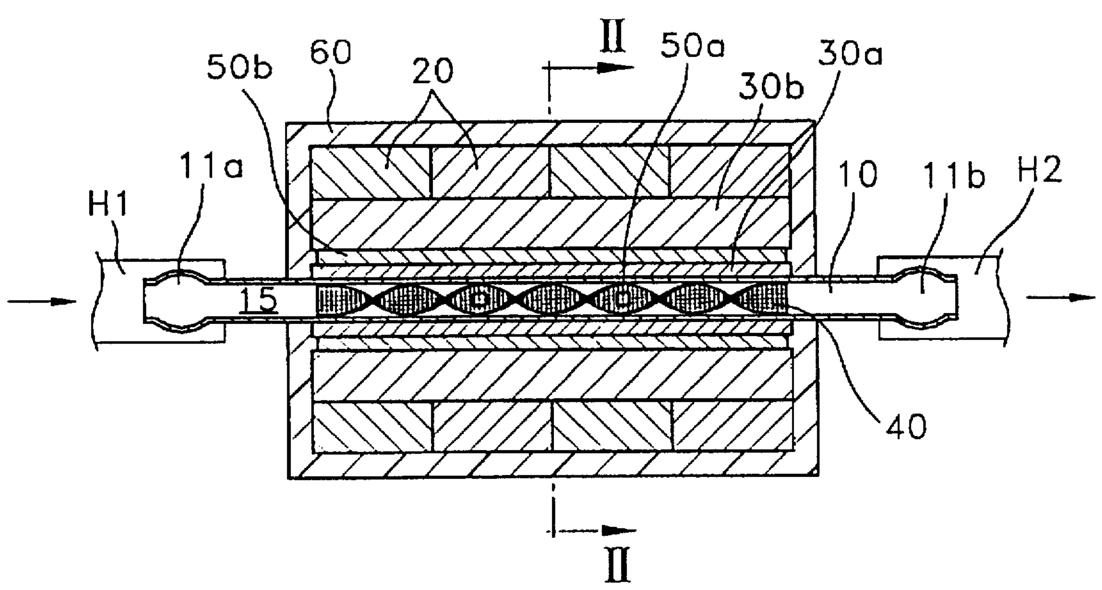
FIG. 2 is a lengthwise enlarged cross-sectional view of a fuel activation apparatus taken along a line I—I of FIG. 1.
Figure 3:
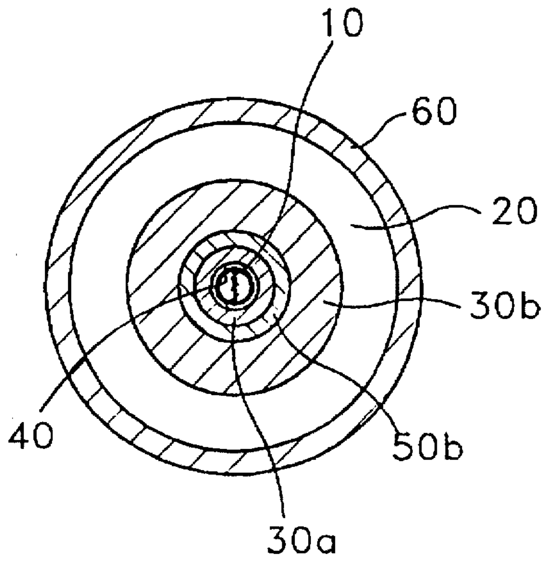
FIG. 3 is a lateral cross-sectional view of a fuel activation apparatus taken along a line II—II of FIG. 2.

FIG. 2 is lengthwise enlarged cross-sectional view taken along a line I—I of FIG. 1, and FIG. 3 is a lateral cross-sectional view taken along line II—II of FIG. 2. As can be seen from the drawings, the fuel activation duct 10 includes a fuel path 15 which allows the fuels flowing from the fuel supply pipes H1 and H2 to be passed therethrough. At the fuel path 15 of the inside of fuel activation duct 10 is disposed a helical net 40, having regular equal spaces together with a predetermined length and width. A first magnetic body **50*a* of a small plate is attached to the helical net 40. As shown in FIG. 2, it is designed so that two magnetic bodies are placed in a predetermined interval, but the number can be changed if necessary. The first magnetic body 50*a* is to magnetize the helical net 40, and has a size of one hundreds or so, compared with the conventional. If the helical net 40 is made of a material possessing the property of magnetism, no first magnetic body 50*a*** required, but this case has is some difficulty in fabrication.

Figure 4:
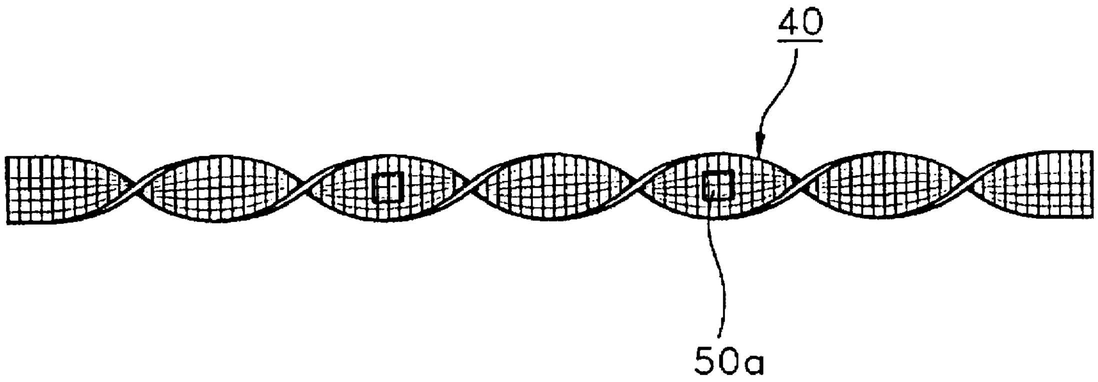
FIG. 4 is a enlarged perspective view with respect to a helical net of a fuel activation apparatus according to the present invention.

The helical net 40 makes the fuels passing through the fuel activation duct 10 rotate and flow for a long time, and at the same time a plurality of spaces thereof enable a magnetic force to be effective around the whole fuels. A first magnetic control layer 30*a* having a predetermined thickness, which is made of a non-magnetic body, is located at the external surface of the fuel activation duct 10. The first magnetic control layer 30*a* enables the magnetic force of a second magnetic body 50*b* described hereafter to properly function on the fuel of the fuel activation duct 10. This function is performed by adjusting the thickness of the first magnetic control layer 30*a*. The reason is because the magnetic force of the second magnetic body 50*b* depends on the thickness of the first magnetic control layer 30*a*. The second magnetic body 50*b* is disposed on the external side of the magnetic control layer 30*a*, and the magnetic force thereof functions indirectly on the fuels flowing through the fuel activation duct 10 by the magnetic control layer 30*a*. On the external side of the second magnetic body 50*b* is installed a second magnetic control layer 30*b*, made of a non-magnetic body, which is thicker than the first magnetic control layer 30*a*. This is for the purpose that the externally transmitted magnetic loss is shielded, and makes magnetic force induced to magnetization members 20 appropriately affect the fuels. A number of divided magnetization members 20 are positioned on the external surfaces. It is preferred that the magnetization members 20 are made of ferrite of a ring shape, have in themselves no magnetic property and are magnetized by the magnetic force coming from the first and second magnetic bodies 50*a* and 50*b*. The magnetization members may be composed of a predetermined number of connected ring-shaped ferrite members. After the magnetic force induced to the magnetization members 20 is lessened to a predetermined intensity passing through the first and second magnetic control layers 30*a* and 30*b*, the magnetic force influences the fuels flowing through the fuel activation duct 10. That is, the magnetic force of the magnetization members 20 is in contact with that of the first and second magnetic bodies 50*a* and 50*b*, and then is effective on the fuels, thereby further maximizing the ionization of the fuel particles. Of course, to adjust the intensity of the magnetic force, the first magnetic control layer 30*a* can be made thicker than the second magnetic control layer 30*b*. FIG. 4 is an enlarged-perspective view with respect to a helical net of FIG. 2. As described above, on the helical net 40 are formed a plurality of spaces, in which two first magnetic bodies 50*a* are disposed at a predetermined interval. A twisted state, spaces in number and size, and the number of the first magnetic body 50*a* with respect to the helical net 40 can be regulated properly. Such a helical net 40 makes the fuels passing through the fuel activation duct 10 rotatably flow, and simultaneously the magnetic force reaches the whole fuel uniformly.

The operation of the fuel activation apparatus using the magnetic body according to the present invention will be described in more detail with reference to FIGS. 2 and 3.

Both ends 11*a* and 11*b* of the fuel activation duct 10 are connected with the fuel supply pipes H1 and H2 so that the fuel can pass therethrough. Therefore, the fuel flows from fuel supply pipe H1 of the fuel supply end to the fuel supply pipe H2 of the fuel consumer end via fuel activation duct 10. A magnetic force from the first magnetic body 50*a* directly reaches the fuel rotatably flowing within the fuel activation duct 10, and at the same time the fuel is ionized into particles suitable for combustion by the magnetic force from the helical net 40.

On the other hand, the intensity of the magnetic force generated from the second magnetic body 50*b* is lessened as soon as it passes through the first magnetic control layer 30*a*, and affects the fuel activation duct 10. A magnetic force induced to the magnetization members 20, which are magnetized by the magnetic force of the first and second magnetic bodies 50*a* and 50*b*, also sequentially goes through the first and second magnetic control layers 30*a* and 30*b* and then its weakened intensity is effective on the fuel.

That is, a direct magnetic force by the first magnetic body 50*a* and magnetized helical net 40 and an indirect magnetic force by the second magnetic body 50*b* and magnetization members 20 are in a contact with the fuel passing through the fuel activation duct 10, thereby maintaining a maximized state decomposed and ionized into fuel particles so that high fuel combustion efficiency is obtained.

Further, the magnetization members 20 have a characteristic which is magnetized by the magnetic force of the first and second magnetic bodies 50*a* and 50*b*. Accordingly, this characteristic prevents the magnetic force generated from the first and second magnetic bodies 50*a* and 50*b* from being transmitted to the exterior, the magnetic force thereby continuously being effective around the fuel activation duct 10. Furthermore, the structure of the helical net 40 enables the fuel to rotatably flow through the fuel activation duct 10 for a long time. The passed fuel is under the uniform influence of the magnetic force by passing through a plurality of spaces of the helical net 40. That is, the fuels receive the magnetic force coming from the magnetic bodies, and simultaneously are decomposed when they pass through the helical net 40.

As described above, the fuel particles are ionized and decomposed, and minutely split to make an activation state, and so the combustion efficiency can be maximized, thereby providing output increase in vehicles and an effect of reducing harmful gas emitting.

While only certain embodiments of the invention have been specifically described herein, it will be apparent that numerous modifications may be made thereto without departing from the spirit and scope of the invention.

What is claimed is:

1. A fuel activation apparatus which is disposed between a fuel supply end and a fuel consumer end and which enhances combustion efficiency of fuels that are supplied from, the fuel supply end to the fuel consumer end, the fuel activation apparatus comprising:
   - a fuel activation duct having a shape of a hollow pipe, connected between said fuel supply end and said fuel consumer end and provided as a fuel supply path;
   - a helical net having a magnetic property, installed at the inside of said fuel activation duct, for enabling the fuel passing through said fuel activation duct to rotatably flow and making a magnetic force uniformly effective on the fuel therethrough; and
   - further comprising a magnetic body enclosing said fuel activation duct, which is positioned externally thereof.

2. The fuel activation apparatus according to claim 1, further comprising a small magnetic body which is a small-sized plate disposed therein, wherein said helical net is magnetized by said small magnetic body.

3. The fuel activation apparatus according to claim 1, further comprising a first magnetic control layer, disposed between said magnetic body and said fuel activation duct, for controlling the intensity of a magnetic force: of said magnetic body which influences the fuel passing through the inside of said fuel activation duct.

4. The fuel activation apparatus according to claim 3, further comprising a second magnetic control layer, disposed at the external surface of said magnetic body, and enclosing said magnetic body.

5. The fuel activation apparatus according to claim 4, wherein said second magnetic control layer is thicker than said first magnetic control layer.

6. The fuel activation apparatus according to claim 5, further comprising magnetization members, located at the external surface of said second magnetic control layer, in which a magnetic force coming from said first and second magnetic bodies are induced to the fuels passing through said fuel activation duct, thereby facilitating ionization of the fuels.

7. The fuel activation apparatus according to claim 6, wherein said magnetization members are made of ferrite.

8. The fuel activation apparatus using a magnetic body according to claim 7, wherein said magnetization members comprise a predetermined number of connected ring-shaped ferrite members.

9. A fuel activation apparatus which enhances combustion efficiency of fuels that are supplied from a fuel supply end to a fuel consumer end, the fuel activation apparatus comprising:

a fuel activation duct having a shape of a hollow pipe, connected between said fuel supply end and said fuel consumer end and provided as a fuel supply path; and a helical net having the property of magnetism, installed at the inside of said fuel activation duct, for enabling the fuel passing through said fuel activation duct to rotatably flow and making a magnetic force uniformly effective on the fuel therethrough.

10. A fuel activation apparatus having a small magnetic body disposed therein, said apparatus disposed between a fuel supply end and a fuel consumer end and which enhances combustion efficiency of fuels that are supplied from the fuel supply end to the fuel consumer end, the fuel activation apparatus comprising:

a fuel activation duct having a shape of a hollow pipe, connected between said fuel supply end and said fuel consumer end and provided as a fuel supply path; and a single helical net, magnetized by said small magnetic body, said net installed at the inside of said fuel activation duct, for enabling the fuel passing through said fuel activation duct to rotatably flow and making a magnetic force uniformly effective on the fuel therethrough.

11. The fuel activation apparatus according to claim 9, wherein said apparatus comprises a single said helical net.

12. The fuel activation apparatus according to claim 10, wherein said small magnetic body is a small-sized plate disposed in proximity to said helical net.

13. The fuel activation apparatus according to claim 10, further comprising a second magnetic body enclosing said fuel activation duct, which is positioned externally thereof.

14. The fuel activation apparatus according to claim 13, further comprising a first magnetic control layer, disposed between said second magnetic body and said fuel activation duct, for controlling the intensity of a magnetic force of said second magnetic body which influences the fuel passing through the inside of said fuel activation duct.

15. The fuel activation apparatus according to claim 14, further comprising a second magnetic control layer, disposed at the external surface of said second magnetic body, for enclosing said second magnetic body.

16. The fuel activation apparatus according to claim 15, wherein said second magnetic control layer is thicker than said first magnetic control layer.

17. The fuel activation apparatus according to claim 16, further comprising magnetization members, located at the external surface of said second magnetic control layer, in which a magnetic force coming said first and second magnetic bodies are induced to the fuels passing through said fuel activation duct, thereby facilitating ionization of the fuels.

18. The fuel activation apparatus according to claim 17, wherein said magnetization members are made of ferrite.

19. The fuel activation apparatus according to claim 18, wherein said magnetization members comprise a predetermined number of connected ring-shaped ferrite members.

* * * * *